(12) United States Patent
Liu et al.

(10) Patent No.: US 11,023,781 B2
(45) Date of Patent: Jun. 1, 2021

(54) METHOD, APPARATUS AND DEVICE FOR EVALUATING IMAGE TRACKING EFFECTIVENESS AND READABLE STORAGE MEDIUM

(71) Applicant: BAIDU ONLINE NETWORK TECHNOLOGY (BEIJING) CO., LTD., Beijing (CN)

(72) Inventors: Zhaoliang Liu, Beijing (CN); Sili Chen, Beijing (CN); Yongjie Zhang, Beijing (CN)

(73) Assignee: BAIDU ONLINE NETWORK TECHNOLOGY (BEIJING) CO., LTD.

( * ) Notice: Subject to any disclaimer, the term of this patent is extended or adjusted under 35 U.S.C. 154(b) by 24 days.

(21) Appl. No.: 16/510,164

(22) Filed: Jul. 12, 2019

(65) Prior Publication Data
US 2020/0042830 A1 Feb. 6, 2020

(30) Foreign Application Priority Data
Aug. 3, 2018 (CN) .......................... 201810878766.8

(51) Int. Cl.
*G06K 9/62* (2006.01)
*G06T 7/246* (2017.01)
(Continued)

(52) U.S. Cl.
CPC ......... *G06K 9/6262* (2013.01); *G06K 9/6215* (2013.01); *G06T 5/002* (2013.01); *G06T 7/248* (2017.01); *G06T 7/40* (2013.01)

(58) Field of Classification Search
CPC .. G06K 9/6262; G06K 9/4671; G06K 9/6203; G06K 9/6215; G06K 9/6255;
(Continued)

(56) References Cited

U.S. PATENT DOCUMENTS

| 6,064,775 A | * | 5/2000 | Suzuki | G06T 5/009 |
| | | | | 382/108 |
| 9,720,934 B1 | * | 8/2017 | Dube | G06K 9/46 |

(Continued)

FOREIGN PATENT DOCUMENTS

| CN | 101652784 A | 2/2010 |
| CN | 101996406 A | 3/2011 |

(Continued)

OTHER PUBLICATIONS

Office Action dated Mar. 30, 2020 in Corresponding Chinese Application No. 201810878766.8, 8 pages.
(Continued)

*Primary Examiner* — Nay A Maung
*Assistant Examiner* — Jose M Torres
(74) *Attorney, Agent, or Firm* — Dilworth IP, LLC

(57) ABSTRACT

The present disclosure provides a method, an apparatus, a device for evaluating image tracking effectiveness and a readable storage medium. The method includes: extracting feature points from a target image according to a predefined algorithm; determining first texture information for the target image according to the feature points; processing the target image according to a predefined processing policy to derive a contrast image, and determining second texture information for the target image according to the contrast image; and rating the target image according to the first texture information and the second texture information. In the solution provide by the present disclosure, the tracking effectiveness for the target image can be known without having to place the target image into any actual product, nor having to wait until the product has been finalized before the target image tracking effectiveness is determined. Moreover, efficiency can be enhanced when evaluating image tracking effectiveness.

18 Claims, 5 Drawing Sheets

(51) Int. Cl.
*G06T 5/00* (2006.01)
*G06T 7/40* (2017.01)

(58) Field of Classification Search
CPC . G06K 2009/3291; G06T 5/002; G06T 7/246; G06T 7/248; G06T 7/40; G06T 7/41; G06T 2207/10016
See application file for complete search history.

(56) References Cited

U.S. PATENT DOCUMENTS

| | | | |
|---|---|---|---|
| 2008/0212894 A1* | 9/2008 | Demirli | G06T 11/00 382/276 |
| 2014/0376810 A1* | 12/2014 | Kobayashi | G06K 9/4604 382/192 |
| 2015/0146973 A1* | 5/2015 | Yang | G06K 9/6235 382/159 |
| 2015/0294490 A1* | 10/2015 | Lin | G06K 9/52 382/195 |
| 2016/0012594 A1* | 1/2016 | Romanik | G06T 7/337 382/203 |
| 2016/0210511 A1 | 7/2016 | Leong et al. | |
| 2020/0257914 A1* | 8/2020 | Wu | G06K 9/00906 |

FOREIGN PATENT DOCUMENTS

| | | |
|---|---|---|
| CN | 102075786 A | 5/2011 |
| CN | 105205820 A | 12/2015 |
| CN | 107346409 A | 11/2017 |
| CN | 107818313 A | 3/2018 |
| CN | 108288027 A | 7/2018 |
| CN | 108447058 A | 8/2018 |

OTHER PUBLICATIONS

Notice of Allowance in CN Patent Application No. 201810878766.8 dated Dec. 18, 2020.

* cited by examiner

METHOD, APPARATUS AND DEVICE FOR EVALUATING IMAGE TRACKING EFFECTIVENESS AND READABLE STORAGE MEDIUM

CROSS-REFERENCE TO RELATED APPLICATION

This application claims priority to Chinese Patent Application No. 201810878766.8, filed on Aug. 3, 2018, which is hereby incorporated by reference in its entirety.

TECHNICAL FIELD

The present disclosure relates to image processing technology and, in particular, to a method, an apparatus and a device for evaluating image tracking effectiveness, and a readable storage medium.

BACKGROUND

Image tracking refers to the technology of identifying a target image and tracking the target image. For instance, when a user captures the target image using a cell phone, a system may identify the target image and select the target image with a box. In addition, AR (artificial reality) technology also needs target image tracking before presenting a 3D model from AR in a camera image. Hence, the mage tracking technology has a range of application in existing art.

Generally, before the target image is applied to a product, it is required to evaluate a tracking effectiveness for the target image to determine if the target image is easily to being tracked. In prior art solution, the target image is applied to an actual product before the tracking effectiveness for the target image is determined.

However, such prior art solution requires that the product be finalized, so that the image tracking effectiveness can be tested based on the product. Moreover, a model of the product needs to be online, so that the image can be tested using the product. Therefore, in the prior art, an efficiency in evaluating image tracking effectiveness is low, and the image evaluation lags behind product manufacturing.

SUMMARY

The present disclosure provides a method, an apparatus, a device for evaluating image tracking effectiveness and a readable storage medium to address the problem in the prior art that the efficiency in evaluating image tracking effectiveness is low, and the image evaluation lags behind product manufacturing.

A first aspect of the present disclosure provides a method for evaluating image tracking effectiveness, including:

extracting feature points from a target image according to a predefined algorithm;

determining first texture information for the target image according to the feature points;

processing the target image according to a predefined processing policy to derive a contrast image, and determining second texture information for the target image according to the contrast image; and rating tracking effectiveness for the target image according to the first texture information and the second texture information.

Another aspect of the disclosure provides an apparatus for evaluating image tracking effectiveness, including:

an extracting module, configured to extract feature points from a target image according to a predefined algorithm;

a texture information determining module, configured to determine first texture information for the target image according to the feature points;

where the texture information determining module is further configured to process the target image according to a predefined processing policy to derive a contrast image, and determine second texture information for the target image according to the contrast image; and a rating module, configured to rate tracking effectiveness for the target image according to the first texture information and the second texture information.

Yet another aspect of the disclosure provides a device for evaluating image tracking effectiveness, including:

a memory;

a processor; and a computer program, where the computer program is stored in the memory and is configured to be executed by the processor to implement the method for evaluating the image tracking effectiveness according to the first aspect.

Still another aspect of the disclosure provides a readable storage medium, storing thereon a computer program which, when executed by a processor, implements the method for evaluating image tracking effectiveness according to the first aspect.

The method, apparatus, device for evaluating image tracking effectiveness and readable storage medium provide the following technical effects:

the method, apparatus, device for evaluating image tracking effectiveness and readable storage medium provided by the present disclosure includes: extracting feature points from a target image according to a predefined algorithm; determining first texture information for the target image according to the feature points; processing the target image according to a predefined processing policy to derive a contrast image, and determining second texture information for the target image according to the contrast image; and rating tracking effectiveness for the target image according to the first texture information and the second texture information. The method, apparatus, device for evaluating image tracking effectiveness and readable storage medium provided by the present disclosure can derive the texture information from the feature points, and can process the target image, derive the texture information based on the processed image, and then rate the tracking effectiveness for the target image according to the texture information. Thus, the tracking effectiveness for the target image can be known without having to place the target image into any actual product, nor having to wait until the product has been finalized before the target image tracking effectiveness is determined. Moreover, efficiency can be enhanced when evaluating image tracking effectiveness.

DETAILED DESCRIPTION OF THE EMBODIMENTS

Figure 1:
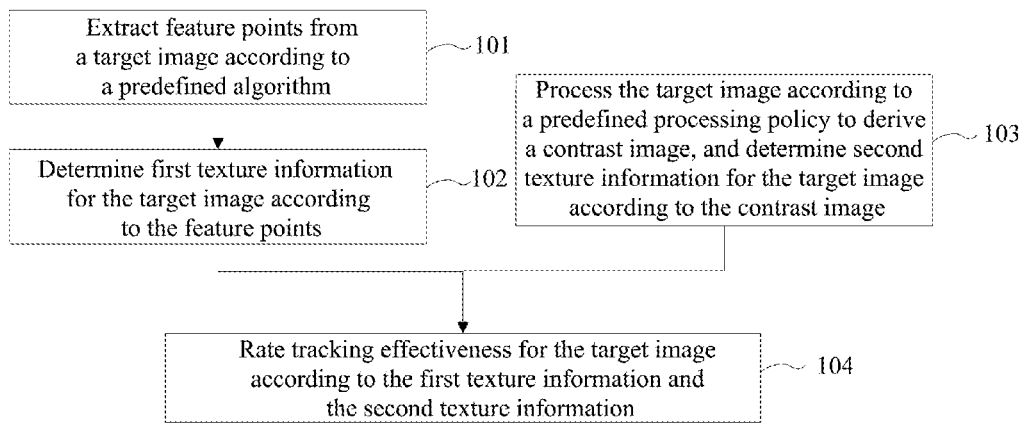
FIG. 1 is a flowchart of a method for evaluating image tracking effectiveness as shown in an illustrative embodiment of the present disclosure.

FIG. 1 is a flowchart of a method for evaluating image tracking effectiveness as shown in an illustrative embodiment of the present disclosure.

As shown in FIG. 1, the method for evaluating image tracking effectiveness as provided in this embodiment includes:

Step 101, extract feature points from a target image according to a predefined algorithm.

The target image refers to an image for which tracking effectiveness is to be determined. The image, which is selected by a user, serves as the basis for performing the method provided in this embodiment. The method provided in this embodiment may be performed by an evaluating apparatus, to which the user may input the target image.

Specifically, an algorithm for extracting the feature points from the image, e.g., ORB (Oriented FAST and Rotated BRIEF) algorithm or sift (Scale-invariant feature transform) algorithm, may be predefined, and the feature points of the image can be extracted based on these algorithms. The feature point may be simply understood as a more significant point in the image, such as a point that falls on a contour, a bright spot in a dark region, a dark spot in a bright region, etc.

Further, feature descriptors corresponding to feature points, which are used to describe characteristics of the feature points, may also be derived according to the predefined algorithm when the feature points are being extracted.

Step 102, determine first texture information for the target image according to the feature points.

The texture information describes surface characteristics of a scenery corresponding to the image or a region in the image. Since an image including richer textures is easier to be tracked, texture information of the image may be acquired as used as a basis for evaluating the tracking effectiveness for the target image.

In practical applications, the first texture information may be determined for the target image according to the extracted feature points. Texture information of an image may be represented as texture richness, texture distribution and/or texture repetition. Hence, such texture information may be determined according to the extracted feature points.

The quantity of the acquired feature points may be used in determining the texture richness in that more feature points indicates richer texture in the target image.

Specifically, the texture distribution may be determined based on how uniformly the feature points are distributed in the target image in that more uniform distribution of the feature points indicates more uniform texture distribution.

Further, characteristics of the feature points and their surroundings may be compared in pairs to determine whether two feature points are similar. For instance, feature descriptors and locations of two feature points may be compared to jointly find out whether the two feature points are similar feature points based on the feature descriptors and locations of the two feature points. More similar feature points implies higher texture repetition in the target image.

Step 103, process the target image according to a predefined processing policy to derive a contrast image; and determine second texture information for the target image according to the contrast image.

The processing policy may be predefined to process the target image, based on which the contrast image may be derived to determine the second texture information.

Specifically, processing such as injecting noise and/or background image may be performed on the target image, the original target image is compared with the processed image, and texture contrast information for the target image may be determined according to the comparative result.

Further, the contrast image from the processing and the original target image may be recognized by an image recognition algorithm. Higher similarity between the contrast image and the original target image may be understood as that the target image has a high contrast to enable the target image to be recognized as the target image even if it has undergone some processing.

The timing for carrying out Steps 101-102 and 103 is not limited, and one may begin from executing the step of deriving the first texture information, or the step of deriving the second texture information, or deriving the first texture information and the second texture information simultaneously.

Step 104: rate tracking effectiveness for the target image according to the first texture information and the second texture information.

Since images including richer textures are easier to be tracked, the tracking effectiveness for the target image may be determined based on the first texture information and second texture information derived. Specifically, the target image may be rated according to the first texture information and second texture information. According to the rating result, the tracking effectiveness may be determined for the target image.

Scores may also be determined for the first texture information and second texture information, respectively, from which a lowest score may be determined to be the rating for the target image. When the first texture information includes multiple types of texture information, e.g., texture richness as well as texture distribution or the like, a score may be determined for each of the texture information, from which a lowest score may be determined to be the rating for the first texture information. Since a poor performance indicator for any one type of the texture information can potentially lead to poor tracking effectiveness for the target image, the lowest score among the texture information may be used to evaluate the tracking effectiveness for the target image.

In practical applications, a mapping from a score to the tracking effectiveness may also be provided. For instance, tracking effectiveness scored at 0-30 may be rated as very poor, 30-60 may be rated as poor, 60-85 may be rated as good, and 85-100 may be rated as very good.

The method provided in this embodiment is used for evaluating the tracking effectiveness for the target image, the method may be implemented by a device on which the method provided in this embodiment is installed, where the device may be implemented using a hardware and/or a software.

The method for evaluating image tracking effectiveness as provided in this embodiment includes: extracting feature points from a target image according to a predefined algorithm; determining first texture information for the target image according to the feature points; processing the target image according to a predefined processing policy to derive a contrast image, and determining second texture information for the target image according to the contrast image; and rating tracking effectiveness for the target image according to the first texture information and the second texture information. The method for evaluating image tracking effectiveness provide by the present embodiment can derive the texture information from the feature points, and can process the target image, derive the texture information based on the processed image, and then rate the tracking effectiveness for the target image according to the texture information. Thus, the tracking effectiveness for the target image can be known without having to place the target image into any actual product, nor having to wait until the product has been finalized before the target image tracking effectiveness is determined. Moreover, efficiency can be enhanced when evaluating image tracking effectiveness.

Figure 2:
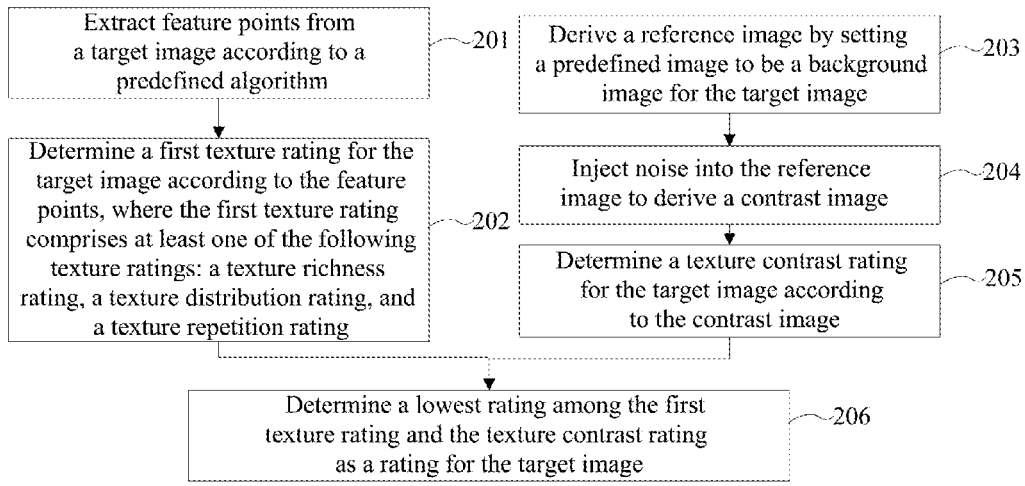
FIG. 2 is a flowchart of a method for evaluating image tracking effectiveness as shown in another illustrative embodiment of the present disclosure.

FIG. 2 is a flowchart of a method for evaluating image tracking effectiveness as shown in another illustrative embodiment of the present disclosure.

As shown in FIG. 2, the method for evaluating image tracking effectiveness as provided in this embodiment includes:

Step 201, extract feature points from a target image according to a predefined algorithm.

Step 201 and Step 101 follow a similar operational principle and serve a similar function, which will not be repeated herein.

Step 202, determine a first texture rating for the target image according to the feature points, where the first texture rating comprises at least one of the following texture ratings: a texture richness rating, a texture distribution rating, and a texture repetition rating.

The texture richness rating may be determined for the target image according to the feature points thereof. More feature points indicates richer textures, hence the texture richness rating may be determined based on a quantity of the feature points. Specifically, this may include:

deriving a quantity of the feature points; and determining the texture richness rating according to the quantity.

Further, an equation may be provided to convert the quantity of the feature points into the texture richness rating. Alternatively, a corresponding relationship between the quantity of the feature points and a texture richness rating may also be provided, e.g., a hundred feature points correspond to fifty scores.

In practical applications, the size of the target image may also impact the texture richness, in that the same quantity of feature points in a small image may appear as richer textures, while when the feature points are arranged in a larger image, the appeared textures is humdrum. Hence, the texture richness rating may alternatively be determined for the target image by combining the quantity of the feature points and the size of the target image.

A quantity of feature points per unit area may be derived based on a quantity of feature points included in a unit area of the target image by, e.g., dividing the quantity of the feature points by the area of the target image. This value is, in turn, used in determining the texture richness rating for the target image in that, more feature points per unit area indicates higher texture richness rating.

Specifically, when the target image has a uniform texture distribution, the image is more conducive to being recognized by a recognition system and thus being tracked. Therefore, the target image may also be determined according to the extracted feature points.

Figure 2A:
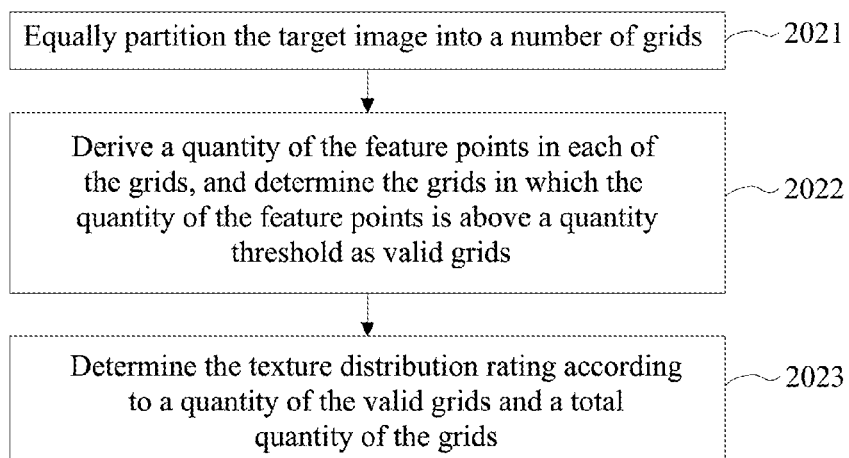
FIG. 2A is a flowchart of a method for determining a texture distribution rating as shown in an illustrative embodiment of the present disclosure.

FIG. 2A is a flowchart of a method for determining a texture distribution rating as shown in an illustrative embodiment of the present disclosure.

As shown in FIG. 2A, the method for determining the texture distribution rating as provided in the present embodiment includes:

Step 2021, equally partition the target image into a number of grids.

The number of the grids may be predefined, and the target image may be equally partitioned according to the number of the grids. Alternatively, a size of the grids may be pre-dimensioned to be k×k, and the target image may be equally partitioned into Q grids according to the size of the grids.

Step 2022, derive a quantity of the feature points in each of the grids, and determine the grids in which the quantity of the feature points is above a quantity threshold as valid grids.

Specifically, the quantities of feature points in each of the grids are derived. Being a point in the target image, location information has to be in place for a feature point in the target image, the grid owning the feature point may be identified based on the location information of the feature point.

Further, the quantity threshold may be predefined, thus a grid including more feature points than the quantity threshold may be determined to be a valid grid. Reversely, a grid including less feature points than the quantity threshold may be determined to be an invalid grid.

Step 2023, determine the texture distribution rating according to a quantity of the valid grids and a total quantity of the grids.

In practical applications, a ratio of the quantity of the valid grids over the total quantity of the grids may serve as the texture distribution rating. A higher ratio indicates more valid grids, i.e., a larger proportion of grids including relatively more feature points, indicating that the feature point are uniformly distributed in the target image, i.e., the texture distribution is uniform. A lower ratio indicates the feature points congregate in a smaller portion of the grids, and thus the target image has non-uniform texture distribution.

Figure 2B:
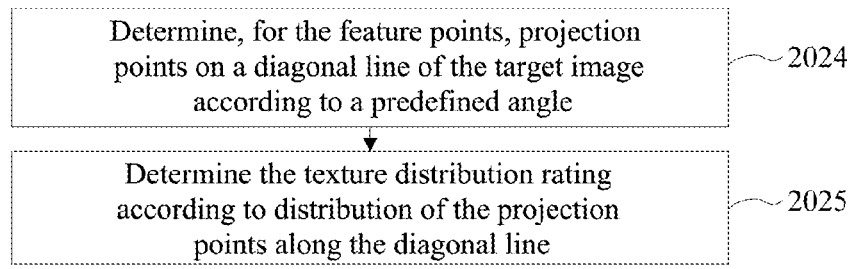
FIG. 2B is a flowchart of a method for determining a texture distribution rating as shown in another illustrative embodiment of the present disclosure.

FIG. 2B is a flowchart of a method for determining a texture distribution rating as shown in another illustrative embodiment of the present disclosure.

As shown in FIG. 2B, the method for determining the texture distribution rating as provided in the present embodiment includes:

Step 2024, determine, for the feature points, projection points on a diagonal line of the target image according to a predefined angle.

The projection angle may be predefined, and the feature points may be projected onto the diagonal line of the target image according to the angle to derive the projection points for the feature points. For instance, a 30 degree angle may be used in determining the projection points for the feature points.

Specifically, a line which travels through a feature point and forms the predefined angle with the diagonal line may be provided, and a projection point for the feature point is found at a crossing point where the line intersects with the diagonal line. When two feature points share a common projection point, such a point may be recorded as two projection points, so that projection points for each of the feature points are accurately determined.

Step 2025, determine the texture distribution rating according to distribution of the projection points along the diagonal line.

Further, the diagonal line may be divided into a number of sections, so that a quantities of projection points on each of the sections may be determined. When the quantities are similar for a majority of the sections, the projection points may be considered to be uniformly distributed. Conversely, when the projection points concentrate on a minority of the sections, the projection points may be considered to be non-uniformly distributed. Alternatively, an average quantity of projection points on the sections may be calculated. When the quantity of projection points included in each of the sections only differs by no more than a quantity threshold of points from the average quantity of projection points, or when the quantities of projection points included in a majority of the sections are no more than the quantity threshold of points, the projection point may be considered to be uniformly distributed.

In practical applications, when the projection points are uniformly distributed on the diagonal line, the feature points may be considered to be uniformly distributed in the target image. Thus, the texture distribution rating may be determined according to the distribution of the projection points on the diagonal line in that, more uniformly distributed projection points indicates higher texture distribution rating, while less uniformly distributed projection points indicates lower texture distribution rating.

However, if the texture distribution is determined according to the projection result from only one angle, the determination may be inaccurate. Hence, more angles may be predefined, from which the projection points may be determined for the feature points, thereby determining texture distribution ratings for the projection points from each of the angles. Now, the texture distribution ratings corresponding to different projection angles may be derived, among which a lowest score may be determined to be a final texture distribution rating.

The texture distribution rating may be determined for the target image using the method according to any one of FIG. 2A or 2B. Alternatively, both methods may be used simultaneously, so that two texture distribution ratings may be determined for the same target image, between which a lower score may serve as the final texture distribution rating for the target image. Alternatively, weights may be assigned to the two rating methods, so that the final texture distribution rating may be derived for the target image from the weighted sum of the two ratings.

Specifically, the repetition in the target image may also has effect on the tracking of the target image by a system in that excessive repetition is disadvantageous in recognizing the target image as a whole. Therefore, a repetition rating may be determined for the target image according to the extracted feature points.

Further, the extracted feature points may be compared in pairs to determine a repetition rating for the target image. When images are compared for their similarities, not much sense will be made if only values of the feature points themselves are compared. For example, an image including many black pixel points does not necessarily indicate each black pixel point is located within identical graphs. Thus, in the comparison process, a feature point may serve as a center, and a feature value may be derived from within a range surrounding the feature point, according to which the comparison may be made to determine whether two feature points are similar.

Figure 2C:
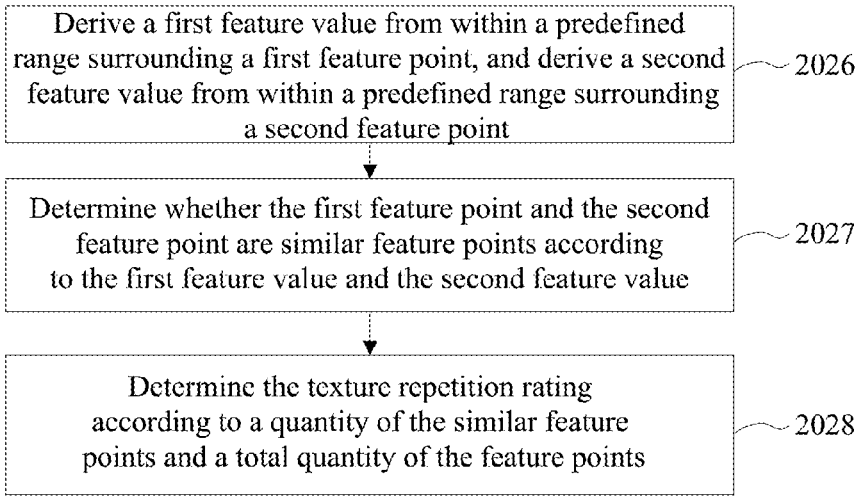
FIG. 2C is a flowchart of a method for determining a texture repetition rating as shown in an illustrative embodiment of the present disclosure.

FIG. 2C is a flowchart of a method for determining a texture repetition rating as shown in an illustrative embodiment of the present disclosure.

As shown in FIG. 2C, the method for determining the texture repetition rating as provided in the present embodiment includes:

Step 2026: derive a first feature value from within a predefined range surrounding a first feature point, and derive a second feature value from within a predefined range surrounding a second feature point.

One of the feature points may be set to be the first feature point while the remaining feature points are all set to be the second feature point, thereby whether there is a second feature point similar to the first feature point is identified.

Specifically, a range may be predefined, the first feature point serves as a center, so that the first feature value may be derived from within the predefined range. Similarly, a second feature point may serve as a center, so that the second feature value may be derived from within the predefined range surrounding the second feature point.

Further, a feature value may include information about every pixel points within the predefined range. Alternatively, the feature value may only include information about pixel points on a border of the predefined range. For instance, when the predefined range is a circle of radius r, the first feature value may include information about pixel points on a circumference of a circle, which takes the first feature point as a center and has a radius r.

Step 2027, determine whether the first feature point and the second feature point are similar feature points according to the first feature value and the second feature value.

In practical applications, the first feature value is compared with the second feature value to determine whether they are close and, if they are close, the first feature point is considered to be similar to the second feature point.

The feature value may be in the form of a vector, e.g., a multi-dimensional vector. When the multi-dimensional vector is binary, Hamming distance may be used in calculating a distance between the feature values. When the multi-dimensional vector is floating point, an Euclidean distance, a cosine distance or the like may be used in calculating the distance between the two.

Specifically, an Euclidean distance between the first feature value and the second feature value may be determined, and the two feature values are considered to be close when the Euclidean distance is small.

Alternatively, the method provided in this embodiment may further include:

determine a spatial distance between the first feature point and the second feature point;

when the first feature value and the second feature value differ by less than a first threshold and the spatial distance is above a second threshold, determine the first feature point and the second feature point to be similar feature points.

Repetition between local graphs may exist in an image, which does not impact the tracking effectiveness for the target image. Thus, the method provided in this embodiment may also determine the spatial distance between the first feature point and the second feature point. When a long spatial distance exists between the first feature point and the second feature point while the feature values are close, the first feature point and the second feature point may be determined to be similar feature points.

The difference between the first feature value and the second feature value may be the Euclidean distance therebetween. When the Euclidean distance between the first feature value and the second feature value is less than the first threshold while the spatial distance therebetween are above the second threshold, the two are similar points. When the spatial distance between the first feature point and the second feature point is being determined, an Euclidean distance algorithm may also be used, which will not be limited herein.

Step 2028, determine the texture repetition rating according to a quantity of the similar feature points and a total quantity of the feature points.

Specifically, a ratio between the quantity of the similar feature points and the total quantity of the feature points may be calculated, from which 1 may be subtracted to determine the texture repetition rating. When two feature points are similar, they are both considered as similar feature points, i.e., the quantity of the similar feature points is two.

Further, too many similar feature points leads to a higher ratio between the quantity of the similar feature points and the total quantity of the feature points, which yields a low texture repetition rating. Thus, more similar feature points indicates lower texture repetition rating, and less similar feature points indicates higher texture repetition rating. This calculation means may be leveraged in measuring the texture repetition.

Step 203, derive a reference image by setting a predefined image to be a background image for the target image.

Step 204, inject noise into the reference image to derive a contrast image.

In practical applications, the target image may be stacked over the predefined image to form the reference image, thus setting the predefined image to be the background image for the target image. For the purpose of enhancing an interference of the background image to the target image, an image with rich texture may serve as the predefined image. Further, an affine transformation, e.g., rotation by an angle, shifting, zooming or the like, may be applied to the target image before stacking the target image over the predefined image.

Then, noise injection process may be applied to the reference image. Specifically, lighting noise alone or both lighting noise and Gaussian noise may be injected into the reference image. The lighting noise is designed to simulate changes in image pixel values caused by lighting conditions. A target image is put into practical applications may be significantly influenced by lighting, hence the lighting noise has a priority of being injected when creating the contrast image. The Gaussian noise is designed to simulate a noise generated by sensors in an image capturing apparatus. The Gaussian noise may also be injected into the reference image to derive the contrast image. Alternatively, the lighting noise and Gaussian noise may both be injected into the reference image.

Step 205, determine a texture contrast rating for the target image according to the contrast image.

The contrast image may be directly compared with the target image. When an existing image recognition method is capable of recognizing the target image from the contrast image, one may understand that the target image has good contrast, and accordingly, a corresponding contrast rating is relatively high.

Figure 2D:
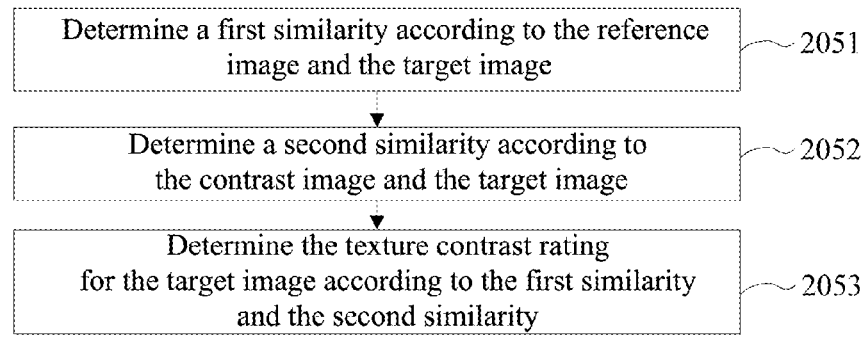
FIG. 2D is a flowchart of a method for determining a texture contrast rating as shown in an illustrative embodiment of the present disclosure.

FIG. 2D is a flowchart of a method for determining a texture contrast rating as shown in an illustrative embodiment of the present disclosure.

As shown in FIG. 2D, the method for determining the texture contrast rating as provided in the present embodiment includes:

Step 2051, determine a first similarity according to the reference image and the target image.

Pixels from the reference image and target image may be compared in pairs, and whether two pixels are similar is determined together with pixel points within a certain range surrounding the pixels. A quantity of pixel points included in the reference image or target image is divided by the quantity of similar pixel points to derive the first similarity. Specifically, the similarity between two images may be determined using an image comparison approach in prior art.

Step 2052, determine a second similarity according to the contrast image and the target image.

Step 2052 and Step 2051 are implemented in a similar manner, which will not be repeated herein.

Step 2053, determine the texture contrast rating for the target image according to the first similarity and the second similarity.

The timing for carrying out Steps 2051 and 2052 is not limited.

Specifically, calculation may be performed to derive a ratio between the first similarity and the second similarity, the texture contrast rating may be determined according to the ratio. When the ratio between the first similarity and the second similarity is small, that is, the reference image does not differ significantly before and after the noise is injected, it may be considered that the target image has good texture contrast, and thus the texture contrast rating is high. For instance, an absolute value of 1 minus the ratio between the first similarity and the second similarity may serve as the texture contrast rating.

The timing for carrying out Steps 201-202 and 203-205 is not limited.

Step 206, determine a lowest rating among the first texture rating and the texture contrast rating as a rating for the target image.

Since a poor performance indicator for any one type of the texture information can potentially lead to poor tracking effectiveness for the target image, the lowest score among the texture information may be used to evaluate the tracking effectiveness for the target image.

A mapping from the rating to the tracking effectiveness may also be provided, and the rating for the target image may be used in determining the tracking effectiveness for the target image.

Figure 3:
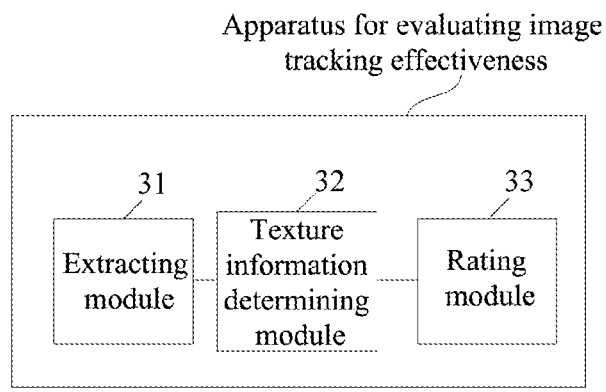
FIG. 3 is a structural diagram of an apparatus for evaluating image tracking effectiveness as shown in an illustrative embodiment of the present disclosure.

FIG. 3 is a structural diagram of an apparatus for evaluating image tracking effectiveness as shown in an illustrative embodiment of the present disclosure.

As shown in FIG. 3, the apparatus for evaluating the image tracking effectiveness as provided in this embodiment includes:

an extracting module 31, configured to extract feature points from a target image according to a predefined algorithm;

a texture information determining module 32, configured to determine first texture information for the target image according to the feature points;

where the texture information determining module 32 is further configured to process the target image according to a predefined processing policy to derive a contrast image, and determine second texture information for the target image according to the contrast image; and a rating module 33, configured to rate tracking effectiveness for the target image according to the first texture information and the second texture information.

The apparatus for evaluating the image tracking effectiveness as provided in this embodiment includes an extracting module, configured to extract feature points from a target image according to a predefined algorithm; a texture information determining module, configured to determine first texture information for the target image according to the feature points; where the texture information determining module is further configured to process the target image according to a predefined processing policy to derive a contrast image, and determine second texture information for the target image according to the contrast image; and a rating module, configured to rate tracking effectiveness for the target image according to the first texture information and the second texture information. The device for evaluating the image tracking effectiveness provide by the present embodiment an derive the texture information from the feature points, and can process the target image, derive the texture information based on the processed image, and then rate the tracking effectiveness for the target image according to the texture information. Thus, the tracking effectiveness for the target image can be known without having to place the target image into any actual product, nor having to wait until the product has been finalized before the target image tracking effectiveness is determined. Moreover, efficiency can be enhanced when evaluating image tracking effectiveness.

The device for evaluating the image tracking effectiveness provide by the present embodiment follows a similar specific principle and implementation manner as the embodiment shown in FIG. 1, which will not be repeated herein.

Figure 4:
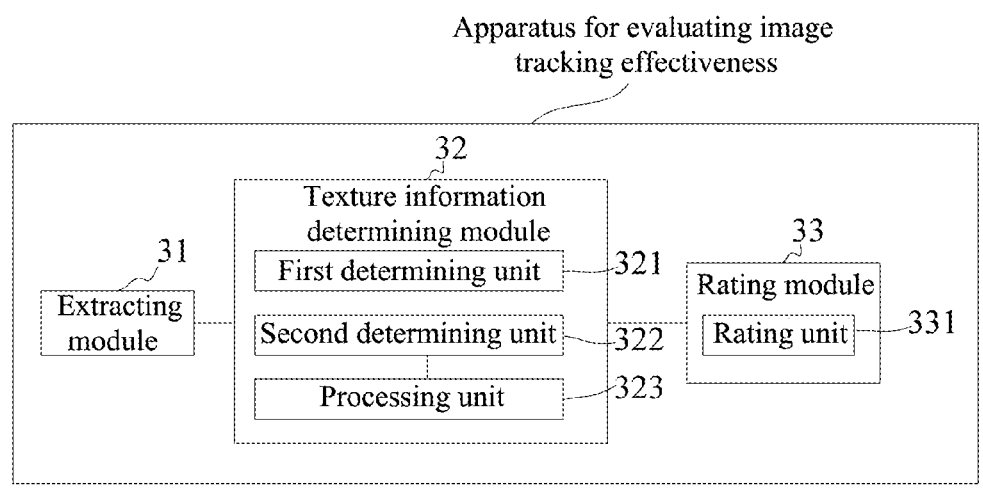
FIG. 4 is a structural diagram of an apparatus for evaluating image tracking effectiveness as shown in another illustrative embodiment of the present disclosure.

FIG. 4 is a structural diagram of an apparatus for evaluating image tracking effectiveness as shown in another illustrative embodiment of the present disclosure.

As shown in FIG. 4, on the basis of the foregoing embodiments, in the apparatus for evaluating the image tracking effectiveness as provided in this embodiment, the texture information determining module 32 includes:

a first determining unit 321, configured to determine a first texture rating for the target image according to the feature points, where the first texture rating comprises at least one of the following texture ratings:

a texture richness rating, a texture distribution rating, and a texture repetition rating;

a second determining unit 322, configured to determine a texture contrast rating for the target image according to the contrast image;

where the rating module 33 includes:

a rating unit 331, configured to determine a lowest rating among the first texture rating and the texture contrast rating as a rating for the target image.

In an embodiment, the first determining unit 321 is specifically configured to:

derive a quantity of the feature points; and determine the texture richness rating according to the quantity.

In an embodiment, the first determining unit 321 is specifically configured to:

equally partition the target image into a number of grids;

derive a quantity of the feature points in each of the grids, and determine the grids in which the quantity of the feature points is above a quantity threshold as valid grids; and determine the texture distribution rating according to a quantity of the valid grids and a total quantity of the grids.

In an embodiment, the first determining unit 321 is specifically configured to:

determine, for the feature points, projection points on a diagonal line of the target image according to a predefined angle; and determine the texture distribution rating according to distribution of the projection points along the diagonal line.

In an embodiment, the first determining unit 321 is specifically configured to:

derive a first feature value from within a predefined range surrounding the first feature point, and derive a second feature value from within a predefined range surrounding the second feature point;

determine whether the first feature point and the second feature point are similar feature points according to the first feature value and the second feature value; and determine the texture repetition rating according to a quantity of the similar feature points and a total quantity of the feature points;

the first determining unit 321 is further configured to:

determine a spatial distance between the first feature point and the second feature point;

where the determining whether the first feature point and the second feature point are similar feature points according to the first feature value and the second feature value includes:

when the first feature value and the second feature value differ by less than a first threshold and the spatial distance is above a second threshold, determine the first feature point and the second feature point to be similar feature points.

In an embodiment, the texture information determining module 32 includes a processing unit 323 that is configured to:

derive a reference image by setting a predefined image to be a background image for the target image; and inject noise into the reference image to derive the contrast image.

In an embodiment, the second determining unit 322 is specifically configured to:

determine a first similarity according to the reference image and the target image;

determine a second similarity according to the contrast image and the target image; and determine the texture contrast rating for the target image according to the first similarity and the second similarity.

The device provide by the present embodiment follows a similar specific principle and implementation manner as the embodiment shown in FIG. 2 to FIG. 2D, which will not be repeated herein.

Figure 5:
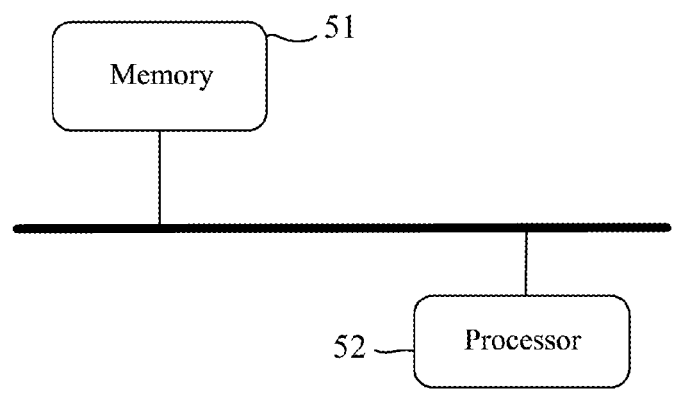
FIG. 5 is a structural diagram of a device for evaluating image tracking effectiveness as shown in an illustrative embodiment of the present disclosure.

FIG. 5 is a structural diagram of a device for evaluating image tracking effectiveness as shown in an illustrative embodiment of the present disclosure.

As shown in FIG. 5, the device for evaluating the image tracking effectiveness as provided in this embodiment includes:

a memory 51;
a processor 52; and
a computer program, where the computer program is stored in the memory 51 and is configured to be executed by the processor 52 to implement any one of the foregoing methods for evaluating the image tracking effectiveness.

An embodiment also provides a readable storage medium, storing thereon a computer program, the computer program, when executed by a processor, implements any one of the foregoing methods for evaluating the image tracking effectiveness.

The readable storage medium may be a computer readable storage medium.

It will be understood by those skilled in the art that all or part of the steps of the foregoing method embodiments may be implemented by hardware in relation to program instructions. The foregoing program can be stored in a computer readable storage medium. The program, when executed, executes steps incorporating the foregoing method embodiments, and the foregoing storage medium includes various media that can store program codes, such as a ROM, a RAM, a magnetic disk, or an optical disk.

Finally, it should be noted that the foregoing embodiments are merely intended for describing, rather than limiting, the technical solutions of the present disclosure. Although the present disclosure is described in detail with reference to the foregoing embodiments, persons of ordinary skill in the art should understand that they may still make modifications to the technical solutions described in the foregoing embodiments, or make equivalent replacements to some or all technical features therein; however, these modifications or replacements do not make the essence of corresponding technical solutions depart from the scope of the technical solutions in the embodiments of the present disclosure.

What is claimed is:

1. A method for evaluating image tracking effectiveness, comprising:
    extracting feature points from a target image according to a predefined algorithm;
    determining first texture information for the target image according to the feature points;
    processing the target image according to a predefined processing policy to derive a contrast image, and determining second texture information for the target image according to the contrast image; and
    rating tracking effectiveness for the target image according to the first texture information and the second texture information;
    wherein the determining first texture information for the target image according to the feature points comprises:
    determining a first texture rating for the target image according to the feature points, wherein the first texture rating comprises at least one of the following texture ratings:
    a texture richness rating, a texture distribution rating, and a texture repetition rating;
    the determining second texture information for the target image according to the contrast image comprises:
    determining a texture contrast rating for the target image according to the contrast image;
    correspondingly, the rating tracking effectiveness for the target image according to the first texture information and the second texture information comprises:
    determining a lowest rating among the first texture rating and the texture contrast rating as a rating for the target image.

2. The method according to claim 1, wherein the determining a texture richness rating for the target image according to the feature points comprises:
    deriving a quantity of the feature points; and determining the texture richness rating according to the quantity.

3. The method according to claim 1, wherein the determining a texture distribution rating for the target image according to the feature points comprises:
    equally partitioning the target image into a number of grids;
    deriving a quantity of the feature points in each of the grids, and determining the grids in which the quantity of the feature points is above a quantity threshold as valid grids; and
    determining the texture distribution rating according to a quantity of the valid grids and a total quantity of the grids.

4. The method according to claim 1, wherein the determining a texture distribution rating for the target image according to the feature points comprises:
    determining, for the feature points, projection points on a diagonal line of the target image according to a predefined angle; and
    determining the texture distribution rating according to distribution of the projection points along the diagonal line.

5. The method according to claim 1, wherein the determining a texture repetition rating for the target image according to the feature point comprises:
    deriving a first feature value from within a predefined range surrounding the first feature point, and deriving a second feature value from within a predefined range surrounding the second feature point;
    determining whether the first feature point and the second feature point are similar feature points according to the first feature value and the second feature value; and
    determining the texture repetition rating according to a quantity of the similar feature points and a total quantity of the feature points.

6. The method according to claim 5, further comprising:
    determining a spatial distance between the first feature point and the second feature point;
    wherein the determining whether the first feature point and the second feature point are similar feature points according to the first feature value and the second feature value comprises:
    when the first feature value and the second feature value differ by less than a first threshold and the spatial distance is above a second threshold, determining the first feature point and the second feature point to be similar feature points.

7. The method according to claim 1, wherein the processing the target image according to a predefined processing policy to derive a contrast image comprises:
    deriving a reference image by setting a predefined image to be a background image for the target image; and
    injecting noise into the reference image to derive the contrast image.

8. The method according to claim 7, wherein the injecting noise into the reference image comprises:
    injecting lighting noise and/or Gaussian noise into the reference image.

9. The method according to claim 7, wherein the determining a texture contrast rating for the target image according to the contrast image comprises:
    determining a first similarity according to the reference image and the target image;
    determining a second similarity according to the contrast image and the target image; and
    determining the texture contrast rating for the target image according to the first similarity and the second similarity.

10. An apparatus for evaluating image tracking effectiveness, comprising:
    a memory, a processor, and a computer program stored on the memory and operable on the processor, wherein the processor, when running the computer program, is configured to:

extract feature points from a target image according to a predefined algorithm;

determine first texture information for the target image according to the feature points;

process the target image according to a predefined processing policy to derive a contrast image, and determine second texture information for the target image according to the contrast image; and rate tracking effectiveness for the target image according to the first texture information and the second texture information;

wherein the processor is further configured to:

determine a first texture rating for the target image according to the feature points, wherein the first texture rating comprises at least one of the following texture ratings: a texture richness rating, a texture distribution rating, and a texture repetition rating;

determine a texture contrast rating for the target image according to the contrast image;

determine a lowest rating among the first texture rating and the texture contrast rating as a rating for the target image.

11. The apparatus according to claim 10, wherein the processor is further configured to:

derive a quantity of the feature points; and determine the texture richness rating according to the quantity.

12. The apparatus according to claim 10, wherein the processor is further configured to:

equally partition the target image into a number of grids;

derive a quantity of the feature points in each of the grids, and determine the grids in which the quantity of the feature points is above a quantity threshold as valid grids; and determine the texture distribution rating according to a quantity of the valid grids and a total quantity of the grids.

13. The apparatus according to claim 10, wherein the processor is further configured to:

determine, for the feature points, projection points on a diagonal line of the target image according to a predefined angle; and determine the texture distribution rating according to distribution of the projection points along the diagonal line.

14. The apparatus according to claim 10, wherein the processor is further configured to:

derive a first feature value from within a predefined range surrounding the first feature point, and derive a second feature value from within a predefined range surrounding the second feature point;

determine whether the first feature point and the second feature point are similar feature points according to the first feature value and the second feature value; and determine the texture repetition rating according to a quantity of the similar feature points and a total quantity of the feature points.

15. The apparatus according to claim 14, wherein the processor is further configured to:

determine a spatial distance between the first feature point and the second feature point;

wherein the determining whether the first feature point and the second feature point are similar feature points according to the first feature value and the second feature value comprises:

when the first feature value and the second feature value differ by less than a first threshold and the spatial distance is above a second threshold, determine the first feature point and the second feature point to be similar feature points.

16. The apparatus according to claim 10, wherein the processor is further configured to:

derive a reference image by setting a predefined image to be a background image for the target image; and inject noise into the reference image to derive the contrast image.

17. The apparatus according to claim 16, wherein the processor is further configured to:

determine a first similarity according to the reference image and the target image;

determine a second similarity according to the contrast image and the target image; and determine the texture contrast rating for the target image according to the first similarity and the second similarity.

18. A non-transitory computer readable storage medium, storing thereon a computer program, the computer program, when executed by a processor, implements the method according to claim 1.

* * * * *